L. G. McKAM.
SAW SWAGE.
APPLICATION FILED JULY 5, 1912.

1,056,755.

Patented Mar. 18, 1913.

3 SHEETS—SHEET 1.

WITNESSES:
Paul A. R. Kroesing, jr.
Virginia C. Spratt.

INVENTOR
Lawrence G. McKam
BY
Raymond A. Parker
ATTORNEY

L. G. McKAM.
SAW SWAGE.
APPLICATION FILED JULY 5, 1912.

1,056,755.

Patented Mar. 18, 1913.

3 SHEETS—SHEET 2.

WITNESSES:
Paul A. R. Kroesing, jr.
Virginia C. Spratt.

INVENTOR
Lawrence G. McKam
BY
Ralzemond A. Parker
ATTORNEY

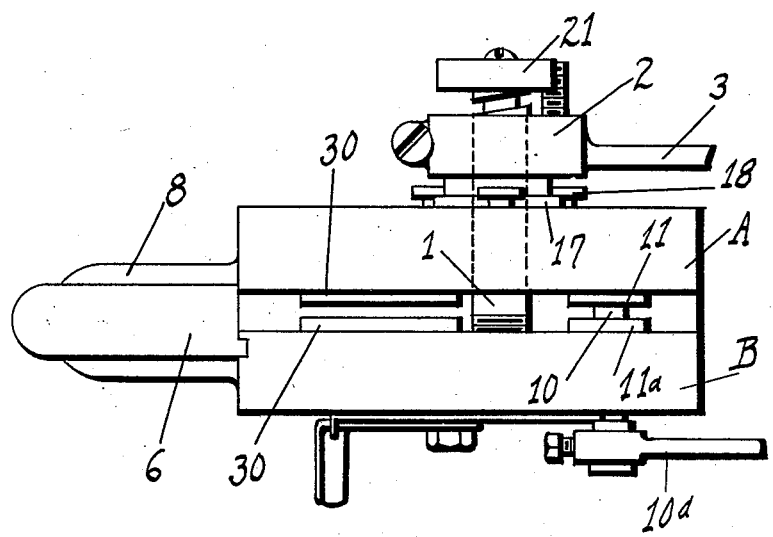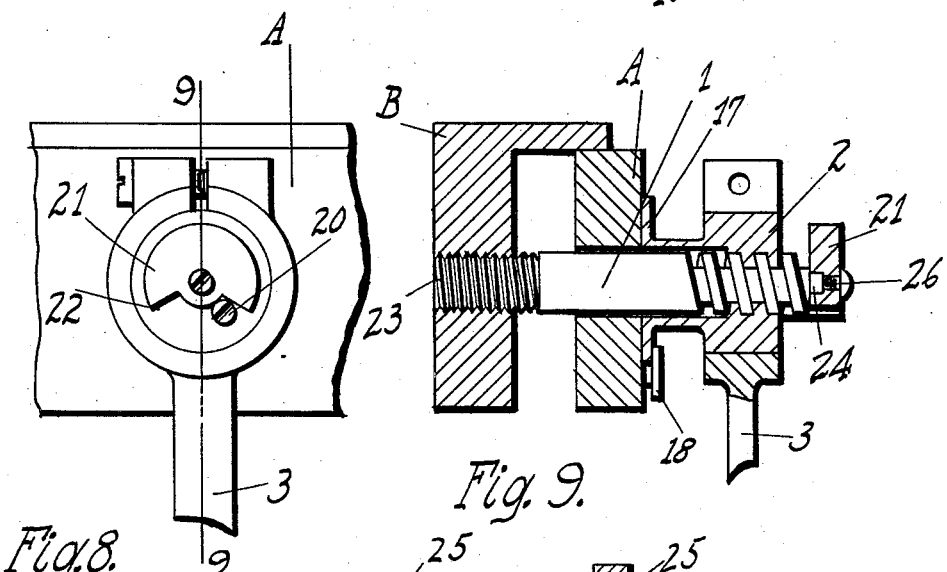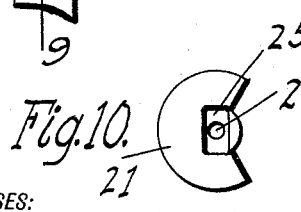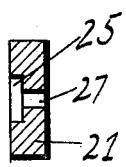

UNITED STATES PATENT OFFICE.

LAWRENCE G. McKAM, OF DETROIT, MICHIGAN, ASSIGNOR TO STANDARD SAW & MANUFACTURING COMPANY, OF DETROIT, MICHIGAN, A CORPORATION OF MICHIGAN.

SAW-SWAGE.

1,056,755.  Specification of Letters Patent.  Patented Mar. 18, 1913.

Application filed July 5, 1912. Serial No. 707,671.

*To all whom it may concern:*

Be it known that I, LAWRENCE G. McKAM, a citizen of the United States, residing at Detroit, county of Wayne, State of Michigan, have invented a certain new and useful Improvement in Saw-Swages, and declare the following to be a full, clear, and exact description of the same, such as will enable others skilled in the art to which it pertains to make and use the same, reference being had to the accompanying drawings, which form a part of this specification.

This invention relates to saw swages and has for its object a machine which has an improved vising arrangement by which the teeth may be gripped very close to the point and simultaneously the saw blade may be gripped at other points. Added to this feature is a novel lever arrangement by which the vising may be effected in a very small throw of the lever. This is accomplished by a screw arrangement which at first operates rapidly, but with small leverage but which later switches over to a larger leverage working less rapidly, thereby, during the first part of the closure of the vising members, they close in rapidly, but later as they meet more resistance they close in less rapidly but the leverage of the lever is increased.

Figure 1:
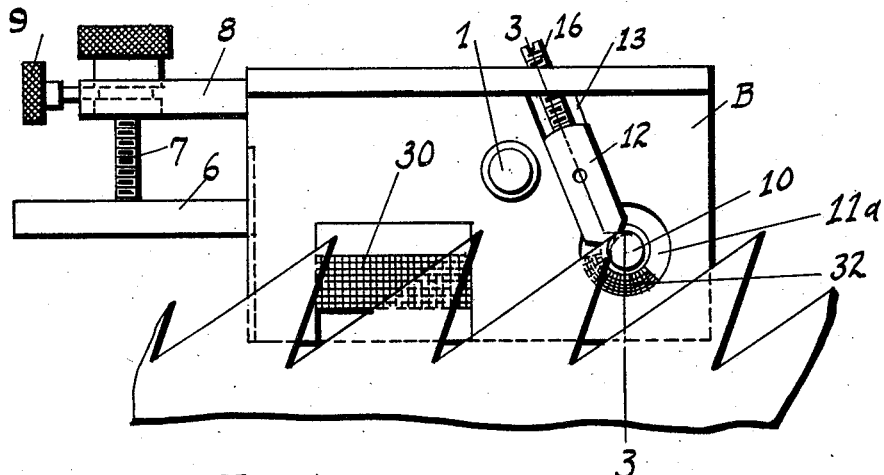
Figure 2:
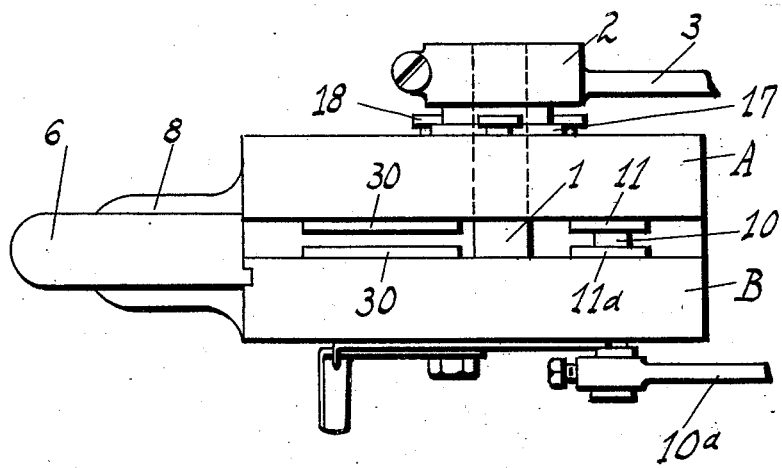
Figure 3:
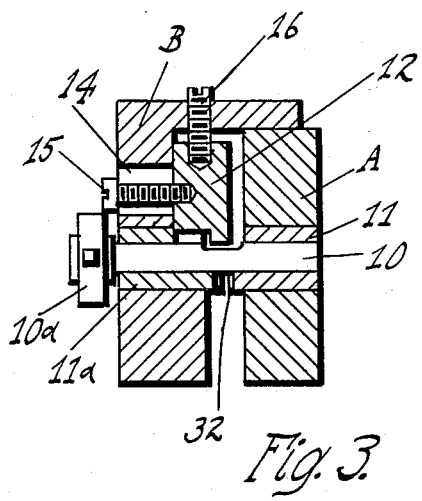
Figure 4:
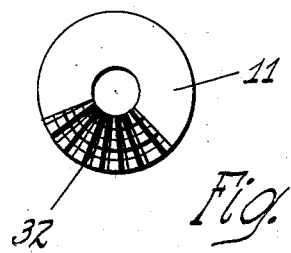
Figure 5:
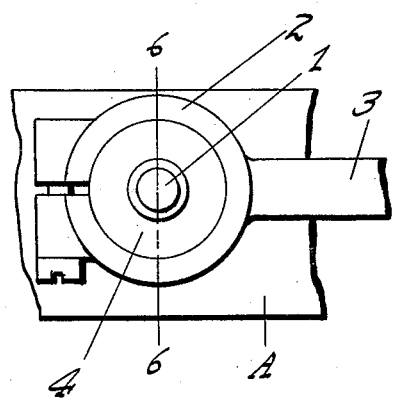
Figure 6:
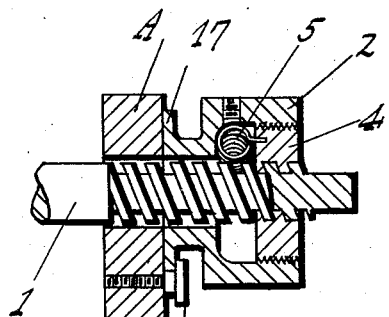

In the drawings:—Figure 1, is a view of the machine with one of the housing blocks removed. Fig. 2, is a bottom plan view of the machine. Fig. 3, is a cross section on the line 3—3 of Fig. 1. Fig. 4, is a front elevation of the bushing that is used to grip the tooth very close to its point. Fig. 5, is a detail elevation of the double nut arrangement by which change of leverage is effected. Fig. 6, is a section on the line 6—6 of Fig. 5. Fig. 7, is a bottom plan view of the machine, showing a different structure for accomplishing the change of leverage as the blocks close in. Fig. 8, is a detail elevation of the structure that changes leverage as the blocks close in, this being a modified form of structure. Fig. 9, is a section on the line 9—9 of Fig. 8. Fig. 10, is a detail of the partly cutaway disk viewed from the side opposite that shown in Fig. 8. Fig. 11, is a detail section of the same disk.

A and B are housing blocks that are movable toward or from each other along the shaft 1. The housing block B has an overhanging portion on its upper side which serves as a guide for the housing block A in its approach or withdrawal from the housing block B. The approach of the block A to the block B is effected by means of the nut 2 that is run along the bolt 1 by the aid of, first, the quick pitch threads upon the bolt and then by the slow pitch threads that are upon the nut 4, which has a yielding connection with the nut terminal 2 by reason of the coiled spring 5 that has one end fastened to the nut terminal 2 and the other fastened to the nut 4. It will be readily understood that as the housing block A first closes in upon the saw that there is practically no resistance and hence the coarse threads of the nut 2 may be utilized, but as the block closes in tighter upon the saw, it is necessary, in order to secure an effective vising operation, that the leverage be increased. Such a change is readily afforded by the double nut arrangement, for when the resistance reaches a given point, it overcomes the tendency of the spring 5 and the nut 4 stops moving, while the nut terminal 2 travels upon the finer threads of the nut 4 and hence the leverage is increased. However, my preferred form of structure, to change the leverage, is that shown in Figs. 7, 8, 9, 10, and 11. In this form the bolt 1 is threaded into the housing block B. At the early stages of closing of the blocks, the nut terminal 2 travels along the coarse threads of the bolt 1. At a given point the pin 20, which works in the cutaway portion of the cutaway disk 21, encounters the shoulder 22. At such a moment the nut 2 ceases to travel on the coarse threads of the bolt 1, but the bolt itself begins to revolve and the finer threads 23, that are threaded into the housing block B, continue to close the housing blocks together, but with a greater leverage. The cutaway disk 21 is fastened to the end of the shaft 1 by a key 24, that engages in the key-way 25. The screw 26 keeps the cutaway disk 21 on the end of the shaft.

At one end of the housing block the swaging roll 10 is journaled in both blocks, so that the blocks can slide on the swaging roll. This roll 10 is operated by a swaging lever 10ª. About the swaging roll engage two bushings 11 and 11ª. These bushings project through the interior faces of the housing blocks, as shown in Fig. 3, and the exposed faces of the bushing are raised and milled, as at 32 in Fig. 4, forming gripping faces which are adapted to grip the saw tooth, as shown in Fig. 1 at a point very close to the point of the tooth and right adjacent the part of the tooth that is being spread by the swaging roll. From inspecting Fig. 1, it will be seen that the tooth is held so close to the point that it would be impossible to distort it, except to the extent desired by the swaging operation. The anvil 12 is slidable in the obliquely set slot 13. The set-screw 16 acts as a backing for the anvil, so that when the anvil has been adjusted in the oblique slot, by turning the screw 15 so that the head engages against the substance of the block B about the slot 14, the set-screw 16 will hold the anvil firmly in such position of adjustment as against the tendency to be forced upward by the action of the swaging roll 10 upon the point of the tooth. Milled gripping members 30 may be provided along the two housing blocks and they may be of different shapes, being rectangular, as shown in the drawings, or circular, or any other desired shape. The gage 6 is slid up and down in the slot of the housing block B by the screw 7, which is journaled in the projection 8 and turns in and out of the gage 6. Any position of adjustment of this gage may be retained by turning the set-screw 9 against the set-screw 7. This gage 6 determines the position that the swage will take with respect to the teeth. The housing blocks are separated by the nut terminal 2 running upon the coarse threads of the bolt 1 and the collar 17 running between the face of the housing block A and the heads of the screws 18. This serves to pull the housing block A along the bolt 1.

The divided housing block arrangement and the bushings, that slide about the swaging roll 10, make possible the gripping of the tooth adjacent the swaging roll and anvil and also the simultaneous gripping of the saw at other points. The structure by which the leverage is changed makes possible the vising of the saw in about a third of a throw of the lever, so that the lever will not interfere with vising devices that may be used to hold the saw, and the vising will not be awkward and tedious by reason of having to throw the lever a considerable distance. Ordinarily the gripping of the tooth is effected by a screw which has a gripping face of small area and hence the screws do not have to open out very far in order to move the swage along the saw. It is, therefore, unnecessary to provide for a closing-in of the dies for a considerable distance with a small throw of the lever. With my arrangement, a very much improved vising arrangement is secured, because of its greater area and its closer proximity to the tooth point. At the same time it requires that the blocks be opened out further in order to allow the instrument to be moved along the saw. This, as already explained, I have arranged to be done with no more throw of the lever than would be used with the ordinary screw-grips. The bushing grips make possible the swaging of saw teeth of very thin saws, such as 22 gage, and thick saws may be also swaged.

What I claim is:—

1. A saw swage, having in combination, a pair of housing blocks slidable toward and from each other, a swaging roll along which said housing blocks slide, gripping faces adjacent said swaging roll for gripping the tooth of the saw and gripping faces at other points along the housing blocks for gripping the saw at other points and means for forcing the housing blocks toward each other, whereby the saw is gripped at the tooth about to be swaged and at other points simultaneously by one application of power, substantially as described.

2. A saw swage, having in combination, a pair of housing blocks slidable toward and from each other, a swaging roll, a pair of bushings carried in the housing blocks and slidable along the swaging roll, the said bushings having gripping faces that are adapted to grip the saw tooth very close to the point and means for forcing the housing blocks toward each other, substantially as described.

3. A saw swage, having in combination, a pair of housing blocks slidable toward and away from each other, a swaging roll, a pair of bushings carried in said housing blocks, slidable along the swaging roll and having gripping faces adapted to engage the saw tooth very close to the point, gripping faces on the housing blocks at other points so as to grip the saw at spaced points along its length and means for forcing the housing blocks together, whereby the saw is gripped near the point of the tooth about to be swaged and also at other points simultaneously by one application of power, substantially as described.

4. A saw swage, having in combination, a pair of housing blocks slidable toward and away from each other, a swaging roll, gripping faces on said housing blocks requiring considerable opening of the blocks to slide them along the saw and a shifting lever arrangement for closing the blocks in and opening them out and increasing the leverage as resistance is met in vising, whereby the blocks can be made to open out further and close in further than is usual with the same throw of the lever, substantially as described.

5. A saw swage, having in combination, a pair of housing blocks slidable toward and away from each other, a swaging roll, gripping faces along said blocks requiring considerable opening out to allow the blocks to slide along the saw, a lever for forcing the blocks together and means for changing the leverage of the power transmitted from the lever to the blocks in closing in, substantially as described.

6. A saw swage, having in combination, a pair of housing blocks slidable toward and away from each other, a swaging roll, a lever and means for transmitting the power of the lever to force the housing blocks together, the said means increasing the leverage of the power as the blocks close in, substantially as described.

7. A saw swage, having in combination, a pair of housing blocks slidable toward and away from each other, a swaging roll, a lever, coarse screw-threads operable in conjunction with said lever for causing the blocks to close in rapidly at first and finer screw-threads operable in conjunction with said lever for causing the blocks to close in less rapidly as resistance is met, but with greater leverage, substantially as described.

In testimony whereof, I, sign this specification in the presence of two witnesses.

LAWRENCE G. McKAM.

Witnesses:
  STUART C. BARNES,
  VIRGINIA C. SPRATT.

Copies of this patent may be obtained for five cents each, by addressing the "Commissioner of Patents, Washington, D. C."